United States Patent Office 2,998,305
Patented Aug. 29, 1961

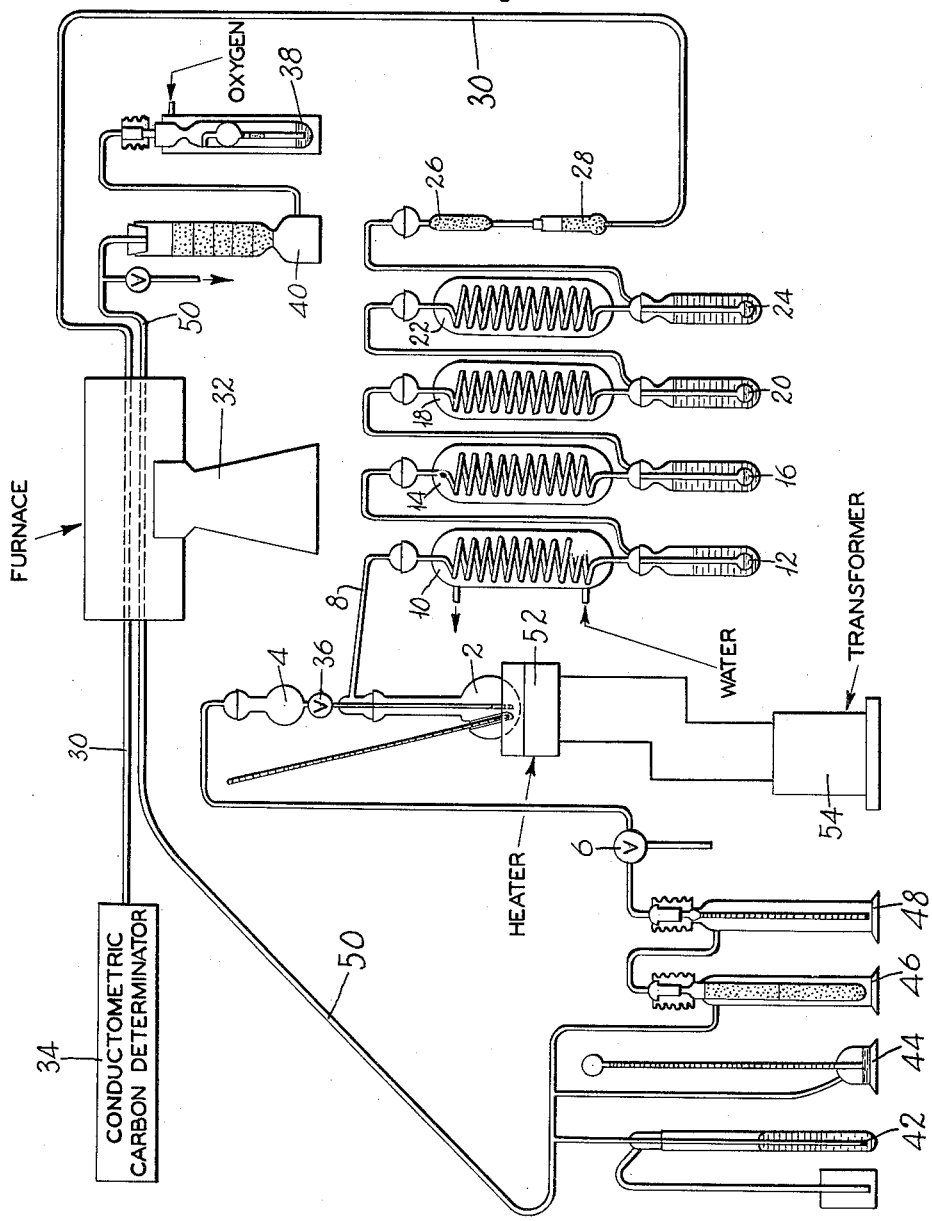

2,998,305
ANALYTICAL DETERMINATION OF CARBON IN REACTIVE METAL HALIDES
James L. Wilson, Niagara Falls, N.Y., assignor to Union Carbide Corporation, a corporation of New York
Filed Aug. 22, 1958, Ser. No. 756,701
4 Claims. (Cl. 23—230)

The present invention relates to a method and apparatus for the quantitative determination of carbon in the halides of the metals of groups IIIB, IVB, and VB of the periodic table.

In the preparation of metal halides of the reactive metals, i.e., the metals of groups IIIB, IVB, and VB of the periodic table (Handbook of Chemistry and Physics, 31st edition, page 336, Chemical Rubber Publishing Company, 1949), the reactive metal halide product is commonly contaminated with carbonaceous matter in the form of several compounds such as cyanuric chloride, carbon dioxide, mono-, di- and tri-chloroacetyl chloride, carbon tetrachloride, cyanogen chloride, carbon oxysulphide, phosgene and others. The carbon content in such halides may vary from as much as 100 parts per million to less than 1 part per million.

Reduction of these reactive metal halides is commonly employed as a means for producing the elemental metal. When a reactive metal is produced from carbon-contaminated reactive metal halides the carbon carries over into the product, and produces a degrading effect on the metal.

It would be desirable to be able to determine, analytically, the amount of carbon present in the reactive metal halide prior to use in reduction, or other, processes. However, the carbon is present in such small quantities as so many different and dissimilar compounds, that chemical analysis by standard techniques is both difficult and inaccurate, and elaborate apparatus and complicated techniques must be employed if a reasonably accurate determination is to be obtained.

Accordingly, it is an object of this invention to provide a method for analytically determining the carbon contamination of halides of periodic table groups IIIB, IVB, and VB metals which method is consistently reliable and accurate.

Another object of this invention is to provide a method for analytically determining the carbon contamination of titanium chlorides.

A further object of this invention is to provide an apparatus which may be employed to obtain a consistently accurate and reliable analysis of the carbon contamination of metal halides.

Further objects and advantages of this invention will become apparent from the specification and appended claims.

The single figure is a schematic representation of the preferred form of the apparatus used to carry out the method of this invention.

The method which satisfies the objects of the present invention comprises effecting the dissolution of the carbon-contaminated reactive metal halide in an aqueous sulfuric acid solution whereby substantially all of the combined and free halogens contained in said carbon-contaminated reactive metal halide are converted to and evolved as gaseous halogens and halogen compounds; absorbing these evolved halogens and halogen compounds; treating the substantially halogen- and halide-free aqueous acid solution of the carbon-contaminated reactive metal halide with a strong oxidizing agent whereby the carbonaceous impurity is oxidized to, and evolved as, at least one gaseous oxide of carbon; sweeping the gaseous oxide of carbon from the aqueous acid solution of the reactive metal halide by passing an oxygen stream therethrough to produce a gaseous mixture of said oxygen and said oxide of carbon; removing from said mixture any sulfur compounds, halogen compounds and moisture which became entrained therein during the aforementioned oxygen sweeping; oxidizing any carbon monoxide in said mixture to carbon dioxide; passing the oxygen stream containing the carbon dioxide into an aqueous solution of a suitable water-soluble hydroxide of a metal having a substantially insoluble carbonate whereby said metal hydroxide combines with said carbon dioxide to form said carbonate, thereby altering the conductivity and resistance of said aqueous solution; and measuring the change in conductivity or resistance of the solution which change is a direct function of the carbon content of the initial metal halide.

The analytical method of the present invention is particularly suitable for the determination of carbon in carbon-contaminated titanium chlorides and the following discussion of the invention refers specifically to such a determination in many instances. However, this is not meant as a limitation since the invention may also be advantageously employed for the determination of the carbon-contamination of halides of the other reactive metals of groups IIIB, IVB and VB of the periodic table (Handbook of Chemistry and Physics, 31st edition, page 336, Chemical Rubber Publishing Company, 1949).

In effecting the dissolution of the carbon-contaminated reactive metal halide in an aqueous sulfuric acid solution, it has been found to be advantageous, where possible, to first dissolve the halide in water and then add the acid to the aqueous solution. By following this procedure, the rate of solution is more readily controlled thereby minimizing the rate of heat evolution during the dissolution and correspondingly reducing the possibility of errors in the analysis due to volatilization and loss of solution components.

In the case of a reactive metal halide such as titanium tetrachloride which is a water-soluble liquid, it is possible to add the liquid halide to water dropwise until all of the halide is dissolved and then acidify the solution with sulfuric acid. However, some of the reactive metal halides are solids at room temperature and are not readily soluble in water. In such cases, it is necessary to employ an aqueous solution of a suitable mineral acid to effect the dissolution.

It is obvious that carbon-containing acids such as the organic acids are to be avoided since they would provide additional carbon which would obscure the analysis. If hydrochloric acid is employed for the dissolution, the resulting solution must be further acidified with sulfuric acid in order to evolve the hydrogen halide; failure to observe this procedure would give rise to hydrogen halide evolution during the course of the analysis which would interfere with the analysis and seriously impair the accuracy of the carbon determination. When a solution of sulfuric acid is employed to dissolve the metal halide, no further acidification is necessary. However, in all of the solutions, the sulfuric acid concentration must be sufficiently high to produce a solution substantially free from halogen and halide contamination.

Throughout the dissolution and acidification, the temperature of the solution is preferably maintained below about 60° C. Cooling may be effected by any suitable means. The heat evolved during dissolution and acidification may be more easily dissipated if these steps are performed slowly and stepwise.

The hydrogen halide and other volatile halogen compounds evolved during the acidification procedure are removed by absorption. By passing a non-interfering gas through the acidified solution, these halogen gases are entrained and passed into an absorption train where the halogen compounds are removed. Dry oxygen, free from contamination with carbonaceous impurities is suitable as an entraining, or carrier gas. Inert gases such as argon, neon and xenon could also be employed as the carrier gas; however, since oxygen is necessary for subsequent steps of the analytical procedure and is, therefore, available for use, it will be generally found to be most convenient for use as the carrier gas.

An aqueous solution of hydrazine sulfate has been found to be a suitable absorbent for the absorption of the halogen compounds. However, the other suitable absorbents which are well known in the art may also be employed.

When the acidified solution is substantially free from halogens and halogen-containing compounds, the solution is treated with a strong oxidizing agent whereby the carbonaceous impurities are converted to at least one of the gaseous oxides of carbon, i.e., carbon monoxide and/or dioxide. A solution comprising chromic oxide ($CrO_3$) and potassium iodate dissolved in concentrated sulfuric acid has been found to be suitable for this purpose. After the oxidizing agent has been added, the solution should be heated to initiate the oxidation reaction. In the case of the chromic oxide-potassium iodate solution, heating to 200° C. has been found to promote the reaction satisfactorily. Above about 250° C. the oxidizing agent decomposes and salts precipitate out of solution.

At the conclusion of the oxidation, carbon dioxide-free oxygen is passed through the solution to remove the gaseous oxides of carbon. In addition to these oxides, halogens, halogen compounds, sulfur compounds and moisture are also picked up by the carrier oxygen stream. Thus it is necessary to remove these impurities if an accurate analysis is to be obtained. This may be accomplished by passing the gas stream through a suitable absorption train. A train having, in series, an aqueous hydrazine sulfate solution for halogen and halogen compound removal, a saturated solution of potassium dichromate in sulfuric acid for removal of sulfur compounds, and concentrated sulfuric acid for moisture removal has been found to be suitable for purification of the pregnant oxygen stream. To insure removal of the impurities, the gas stream may then be passed first through anhydrous calcium sulfate or other suitable drying agent such as silica gel or magnesium perchlorate for further moisture removal, and then through manganese dioxide for removal of halogen and sulfur compounds not previously absorbed.

The oxygen stream containing the gaseous oxides of carbon should now be substantially free from any impurities which might interfere with the analysis. The next step involves the oxidation of any carbon monoxide in the gas stream to carbon dioxide. This may be accomplished by passing the gas stream over copper oxide at a suitable temperature. A temperature of about 800° C. has been found to be effective for the conversion. Other catalysts than copper oxide may be employed for the oxidation reaction provided they do not absorb carbon dioxide.

After the oxidation, the gas stream should consist of oxygen and carbon dioxide. This stream is then passed into an aqueous conductometric solution of a suitable metal hydroxide, which solution has a known conductivity or resistance. The metal hydroxide must be soluble in water, and the metal ion of the hydroxide must have a substantially insoluble carbonate. Thus, when the carbon dioxide-laden oxygen stream is passed into the conductometric solution, the metal hydroxide reacts with the carbon dioxide to produce an insoluble carbonate in the solution. The removal of the metal ions from solution alters the conductivity and resistance of the solution which alterations may be measured by any suitable conductometric apparatus. This change in resistance may be correlated with the resistances of solutions of known concentrations to give a measure of the carbon concentration in the initial sample. The conductometric apparatus may be calibrated, if desired, to give a reading directly in carbon concentration.

Aqueous solutions of barium hydroxide or of strontium hydroxide are suitable for use as the conductometric solution. The reaction with carbon dioxide may be illustrated with barium hydroxide as follows:

$$Ba(OH)_2 + CO_2 \rightarrow BaCO_3\downarrow + H_2O$$

The oxygen stream employed to carry the gaseous oxide of carbon through the system must ordinarily be free from carbon monoxide and carbon dioxide. No limitation is placed on the method of obtaining a carbon dioxide-free oxygen stream employed as a carrier gas in the present process. However, it may be suitably purified by passing it through concentrated sulfuric acid thereby removing moisture, by passing the dried oxygen through layers of glass wool, anhydrous magnesium perchlorate, and asbestos coated with sodium hydroxide whereby residual moisture and carbon dioxide are removed, oxidizing all remaining carbonaceous matter to carbon dioxide and subsequently removing said carbon dioxide and moisture by passing the oxygen stream through layers of asbestos coated with sodium hydroxide, anhydrous magnesium perchlorate and glass wool.

The apparatus which satisfies the objects of this invention is shown in FIGURE 1. It comprises a closed reaction vessel 2 equipped with fluid introducing means 4 for introducing fluid below the surface of the metal halide sample being tested, with the fluid introducing means 4, being connected to a source of pure oxygen at valve 6. Closed reaction vessel 2, communicated through outlet conduit 8, positioned above the surface of said liquid sample being tested, with an absorption train consisting of the series arrangement of elements 10, 12, 14, 16, 18, 20, 22, 24, 26 and 28 for the sequential removal of gaseous halogen compounds, sulfur compounds, and moisture, and a combustion tube 30 for conversion of carbon monoxide to carbon dioxide with furnacing means 32 for heating the combustion tube 30. The product gas stream from combustion tube 30 discharges into a carbon dioxide conductometric measuring device 34 for determination of the carbon contamination.

Reaction vessel 2, may consist of any suitable type of vessel which is not reactive with the reagents and metal halides employed. The reaction vessel must be equipped with a delivery tube above the surface of the liquid sample to be tested. The delivery tube acts as a gas removal conduit and is connected to an absorption train comprising elements 10 through 28. The reaction vessel should be equipped with a temperature measuring device for maximum control of the reactions.

The fluid introducing means 4 must be closed to the atmosphere. The entrance should be connected to an oxygen source for flushing out the system to prevent contamination of the metal halide solution with air contaminants. Valve 36 is a means of regulating the flow of sulfuric acid, oxidizing agent and oxygen into reaction flask 2. The long stem of fluid introducing means 4 extends into reaction flask 2 below the surface of the liquid sample being tested.

Absorption train elements 10–28, which are connected by a gas removal conduit 8 to reaction flask 2, consist of a series of four-glass coil condensers, 10, 14, 18, and 22, each one being equipped with a bubbling tube 12, 16, 20 and 24. Condenser 10 is cooled preferably by water whereas the other condensers are preferably air cooled. The condensers are selected to accommodate any suckback of the absorption liquid during the analysis. Each has a delivery tube extending below the level of the absorption solution in the bubbling tube, which delivery tube preferably ends in a bulb formation having several small openings. These openings tend to break the gas into small bubbles.

The first two bubbling tubes 12 and 16, contain aqueous hydrazine sulfate solution which absorbs any halogens and halogen compounds entrained in the gas stream passed therethrough. Since the gas is passed through the solution in small bubbles, the removal of the halogen impurities is facilitated. Bubbling tube 20 contains sulfuric acid saturated with potassium dichromate which absorbs any sulfur compounds contained in the gas stream passed therethrough. Bubbling tube 24 contains concentrated sulfuric acid which absorbs any moisture from the gas stream passed therethrough. Each of the bubbling tubes has a conduit above the level of the absorption fluid which leads to the next sequential condenser. The conduit from the fourth bubbling tube 24 is connected to two absorbing traps 26 and 28. Trap 26 contains anhydrous calcium sulfate which absorbs any remaining moisture in the oxygen stream. Trap 28 is filled with manganese dioxide which removes any halogen or sulfur compounds still entrained in the oxygen stream.

Combustion tube 30 is connected to the exit of trap 28. This combustion tube preferably consists of a temperature resistant tube containing copper oxide. For example, Vitrosil (registered trade-mark of the Thermal American Fused Quartz Company), a vitreous silica or fused rock crystal containing about 99.8 percent $SiO_2$, is suitable for this purpose. Tube 30 is encased in a combustion furnace 32 which is capable of heating the tube to at least 800° C. Any carbon monoxide entrained in the oxygen stream passing over the heated copper oxide is oxidized to carbon dioxide in combustion tube 30.

The exit of combustion tube 30 is connected to a standard conductometric measuring apparatus 34. Preferably, the apparatus employs an aqueous solution of barium hydroxide for the conductometric solution. However, this does not represent a limitation on the apparatus, and any conductometric apparatus suitable for carbon dioxide determination may be employed.

An apparatus suitable for purifying oxygen for use in the method of the present invention is shown in FIGURE 1, and consists of sulfuric acid tower 38, purifying jar 40, combustion tube 50, electric furnace 32, mercury filled tube 42, manometer 44, purifying tower 46, fluid flow indicating device 48, and three-way valve 6.

In sulfuric acid tower 38 moisture is removed from impure oxygen. The dried gas is further dried and freed from carbon dioxide in purifying jar 40, which contains, in sequential layers, glass wool, a suitable desiccant, for example, magnesium perchlorate, a suitable carbon dioxide absorbent, for example, asbestos coated with sodium hydroxide, a second layer of magnesium perchlorate, and a second layer of glass wool.

Any carbonaceous matter remaining in the stream is converted to carbon dioxide in furnace 32 wherein the gas stream passes over copper oxide in tube 50. Mercury tube 42 with a side delivery escape tube serves as a safety device against pressure surges. In case of a sudden surge of pressure, the head of mercury tends to counteract the pressure surge. Mercury manometer 44 is used to measure the pressure.

Purifying tower 46 is similar to purifying jar 40 and is used to remove moisture and carbon dioxide from the oxygen stream. Flow meter 48 is used to indicate the oxygen flow rate. Any of the standard type flow meters used to measure gas flow, for example, gas rotometers, are suitable. The three-way valve 6 is used to release the pressure in the system and to admit oxygen into the system.

The operation of the apparatus in the practice of the present invention will be illustrated by the analysis of the carbon content of a sample of titanium tetrachloride. A sample of titanium tetrachloride weighing 17.95 grams was transferred to reaction vessel 2 immersed in an ice-water bath and containing 20.0 milliliters of carbon dioxide-free distilled water. The titanium tetrachloride was added to the water dropwise so that cloud formation and volatilization of the titanium tetrachloride were avoided. When all of the titanium tetrachloride was added to reaction vessel 2 the vessel was placed in the portion in the analytical apparatus as shown in FIGURE 1. The system was then flushed with carbon dioxide-free oxygen for five minutes at an oxygen rate of 0.5 liter per minute as indicated on flowmeter 48. This stream of gas was vented to the atmosphere after it passed over the heated copper oxide contained in combustion tube 30 enclosed in furnace 32. A subsequent five minute flushing with oxygen at a flow rate of about 400 milliliters of oxygen per minute was carried out through the entire system including the barium hydroxide solution contained in the cell of conductometric apparatus 34. The conductrometric determinator was zeroed and the lines on the oscilloscope were brought together. The flow of oxygen through the system was stopped by closing valve 36. The pressure in the fluid introducing means 4 was relieved by opening valve 6 to the atmosphere. Seventy-five milliliters of carbon dioxide-free sulphuric acid of specific gravity of 1.84 were added to fluid introducing means 4. After turning three-way valve 6 to again place fluid-introducing means 4 under pressure and partially opening valve 36 the sulphuric acid was allowed to drop very slowly into the titanium tetrachloride solution in reaction vessel 2. The rate of addition of the sulphuric acid was such that the flow of gas to the barium hydroxide solution of conductometric apparatus 34 did not exceed 400 milliliters per minute. The temperature of the liquid in reaction vessel 2 was controlled and permitted to rise to about 60° C. When all of the sulphuric acid was added the system was flushed with oxygen for a period of five minutes at a rate of about 400 milliliters per minute to remove the hydrochloric acid and volatile chloride compounds evolved during the reaction.

During the flushing period reaction vessel 2 was agitated periodically. At the conclusion of the flushing, heating unit 52 was placed in contact with reaction vessel 2 while the flow of oxygen was stopped by closing valve 36. The pressure in the fluid introducing means 4 was relieved by opening valve 6 to the atmosphere. Fifty milliliters of an oxidizing solution comprising 15.0 grams of chromic oxide ($CrO_3$) and 15.0 grams of potassium iodate ($KIO_3$) dissolved in 300 milliliters of carbon dioxide-free concentrated sulphuric acid were added to fluid introducing means 4. Valve 6 was turned so that fluid introducing means 4 was again under pressure and valve 36 was opened to admit approximately 25 milliliters of the oxidizing solution to flow into the reaction vessel 2. Powerstat 54 was activated whereby the mixture in vessel 2 was heated quickly by heater 52 to a temperature of 200° C. At this point an additional 25 milliliters of the oxidizing solution was added to the contents of reaction vessel 2. Valve 36 was then closed and the temperature of the contents of the reaction vessel was permitted to reach a temperature of about 250° C. At this point the heat input was stopped. The entire system was then flushed with oxygen for approximately 25 minutes at a flow rate of 420 milliliters per minute and the carbon content of the sample being analyzed was determined by measuring the resistance flow given by conductometric apparatus 34. The entire procedure was repeated for a second sample of titanium tetrachloride and the following results were obtained. The first sample had a carbon content of 7.4±0.38 parts per million of carbon and the second sample showed a carbon content of 7.3±0.38 parts per million.

The conductometric apparatus employed in the above and following examples was the Leco Conductometric Carbon Determinator CD–10 manufactured by the Laboratory Equipment Corporation of Saint Joseph, Michigan. In order to calibrate the apparatus, a solution of National Bureau of Standards potassium acid phthalate was prepared by dissolving 0.2125 gram of the salt in two liters of carbon dioxide-free distilled water. Several resistance determinations were made for varying carbon levels. A graph was constructed according to recognized statistical procedure with 95 percent and 67 percent confidence bands.

To illustrate the consistency of the results obtained by the method of the invention in the analysis of titanium tetrachloride, two 20 gram samples of titanium tetrachloride were removed from the same batch. To the first sample, 50 micrograms of carbon were added in the form of the potassium acid phthalate solution and to the second 100 micrograms were added. The procedure described above for the analysis of these materials was followed; resistance readings of 220 ohms and 375 ohms, respectively, were obtained. When these values were compared to the conductometric calibration graph they were found to correspond to 75 and 112 micrograms of carbon, respectively. Since the original samples weighed 20 grams, division of the micrograms of carbon by the grams of sample gave the carbon contents in parts per million or 3.56 p.p.m. and 5.65 p.p.m., respectively. When the parts per million of carbon added to the initial samples were subtracted from these results, that is, 2.5 parts per million and 5.0 parts per million, respectively, (50 micrograms/20 gram sample and 100 micrograms/20 gram sample, respectively), the value for the carbon content for the first sample was found to be 1.06 and for the second was found to be 0.65. The deviation based on the 95 percent confidence band was constant, for all values, at 0.4 part per million. Accordingly, the two analyses gave the result of 1.06±0.4 parts per million and 0.65±0.4 parts per million of carbon, respectively. Analyzing these results in terms of statistical analysis indicated that these results are practically identical because the two bands overlap and the parts per million of carbon from the batch from which the samples were taken may be reported as 1.0 part per million of carbon.

To illustrate the accuracy of the process of the present invention, samples of National Bureau of Standards ingot iron sample No. 5 and National Bureau of Standards stainless steel sample No. 166–A were analyzed and compared to the results obtained by the National Bureau of Standards. In each case the results were found to be identical.

It would be almost impossible to obtain results similar to those obtained by the method of the invention by employing the standard gravimetric means unless one resorted to the use of a microbalance with its accompanying possibility of errors. The expense, time involved in making a determination and other inherent complications makes such a procedure impractical.

In all of the foregoing examples the following solutions were employed:

*Oxidizing solution.*—15.0 grams of chromic oxide, 15.0 grams of potassium iodate and 200 milliliters of concentrated sulphuric acid (sp. gr. 1.84) were warmed together until the solids dissolved. The solution was then cooled to room temperature and stored in a glass stoppered bottle.

*Hydrazine sulphate.*—10 grams of hydrazine sulphate were dissolved in 500 milliliters of warm carbon dioxide-free distilled water, the solution was cooled to room temperature and stored in a glass stoppered bottle.

*Potassium dichromate saturated sulphuric acid.*—Approximately 100.0 to 105.0 grams of potassium dichromate ($K_2Cr_2O_7$) were mixed with 400 milliliters of carbon dioxide-free distilled water. To this solution 100 milliliters of concentrated sulphuric acid (sp. gr. 1.84) were added slowly with stirring until all of the dichromate dissolved. The solution was then cooled to room temperature and transferred to a glass stoppered bottle. When used only the clear supernatant saturated liquid was employed.

*Barium hydroxide solution.*—Carbon dioxide-free air was bubbled through 38 liters of distilled water for from 2 to 3 hours. In 500 milliliters of this carbon dioxide-free distilled water 20 grams of barium hydroxide ($Ba(OH)_2 \cdot 8H_2O$) were dissolved. The solution was allowed to stand overnight in a glass stoppered bottle. It was then filtered by suction through glass wool contained in a glass tube in a closed system. The filtered solution was added to the 38 liters of carbon dioxide-free distilled water. A separate solution was then prepared containing 2 grams of gelatin and 5 milliliters of 2-ethylhexanol (octyl alcohol) dissolved in 500 milliliters of carbon dioxide-free distilled water. This solution was then added to the bottle containing the barium hydroxide and the total volume was brought to 40 liters of carbon dioxide-free distilled water and mixed thoroughly by bubbling carbon dioxide-free air through the solution from 1 to 2 hours. This solution should stand for a week or longer before using.

What is claimed is:

1. A method for quantitatively determining the carbon content of a carbon-contaminated halide of a reactive, refractory metal selected from the group consisting of metals of groups IIIB, IVB and VB of the periodic table comprising effecting the dissolution of the said carbon contaminated metal halide in an aqueous sulphuric acid solution whereby substantially all of the combined and free halogens contained in said carbon-contaminated metal halide are converted to, and evolved as, gaseous halogen compounds; absorbing said gaseous halogen compound; treating the substantially halogen-free aqueous acid solution of said carbon contaminated metal halide with a strong oxidizing agent whereby the carbonaceous impurity is oxidized to, and evolved as, at least one gaseous oxide of carbon; sweeping said gaseous oxide of carbon from the aqueous acid solution of said metal halide by passing an oxygen stream therethrough to produce a gaseous mixture of said oxygen and said oxide of carbon; removing from said gaseous mixture any sulphur compounds, halogen compounds and moisture entrained therein; oxidizing any carbon monoxide in said gaseous mixture to carbon dioxide; passing the resulting gaseous mixture containing oxygen and carbon dioxide into an aqueous solution of a water-soluble hydroxide of a metal having a substantially insoluble carbonate, whereby said metal hydroxide combines with said carbon dioxide to form said carbonate, thereby altering the conductivity and resistance of said aqueous solution; and determining the degree of carbonate formation by conductometric means.

2. A method for quantitatively determining the carbon content of a carbon-contaminated halide of titanium comprising effecting the dissolution of said carbon-contaminated titanium halide in an aqueous sulphuric acid solution whereby substantially all of the combined and free halogens contained in said carbon-contaminated titanium halide are converted to and evolved as, gaseous halogen compounds; absorbing said gaseous halogen compounds; treating the substantially halogen-free aqueous acid solution of said carbon-contaminated titanium halide with a strong oxidizing agent whereby the carbonaceous impurity is oxidized to, and evolved as, at least one gaseous oxide of carbon; sweeping said gaseous oxide of carbon from the aqueous acid solution of said titanium halide by passing an oxygen stream therethrough to produce a gaseous mixture of said oxygen and said oxide of carbon; removing from said gaseous mixture any sulphur compounds, halogen compounds and moisture entrained therein; oxidizing any carbon monoxide in said gaseous mixture to carbon dioxide; passing the resulting gaseous mixture containing oxygen and carbon dioxide into an aqueous solution of a water-soluble hydroxide of a metal having a substantially insoluble carbonate whereby said metal hydroxide combines with said carbon dioxide to form said carbonate, thereby altering the conductivity and resistance of said aqueous solution; and determining the degree of carbonate formation by conductometric means.

3. A method for quantitatively determining the carbon content of carbon-contaminated titanium tetrachloride comprising adding said titanium tetrachloride to water dropwise while maintaining the temperature of the resulting solution below about 60° C. whereby said titanium tetrachloride is dissolved without substantial volatilization of the solution components; adding to the aqueous solution so produced sufficient sulfuric acid to produce a solution substantially free from chlorine and chloride contamination, any combined and free chlorine contained in the aqueous solution being converted to, and evolved as, gaseous chlorine compounds during the sulfuric acid addition; absorbing said evolved gaseous chlorine compounds; treating the substantially chlorine-free, aqueous, acid solution of said carbon-contaminated titanium tetrachloride with a strong, non-interfering, oxidizing agent whereby the carbonaceous impurity is oxidized to, and evolved as, at least one gaseous oxide of carbon; sweeping said gaseous oxide of carbon from the aqueous acid solution of said metal halide by passing an oxygen stream therethrough to produce a gaseous mixture of said oxygen and said oxide of carbon; removing from said gaseous mixture any sulphur compounds, halogen compounds, and moisture entrained therein; oxidizing any carbon monoxide in said gaseous mixture to carbon dioxide; passing the resulting gaseous mixture containing oxygen and carbon dioxide into an aqueous solution of a water-soluble hydroxide of a metal having a substantially insoluble carbonate whereby said metal hydroxide combines with said carbon dioxide to form said carbonate, thereby altering the conductivity and resistance of said aqueous solution; and determining the degree of carbonate precipitation by conductometric means.

4. An apparatus suitable for the quantitative determination of the carbon content of a carbon-contaminated metal halide selected from the group consisting of halides of metals of groups IIIB, IVB, and VB of the periodic table comprising a closed reaction vessel equipped with a fluid introducing means suitable for introducing strong oxidizing agent and gaseous oxygen below the surface of an aqueous sulfuric acid solution of said metal halide in said closed reaction vessel; said fluid introducing means being connected to a supply of carbon-free oxygen; said closed reaction vessel being equipped with a gas-removal conduit located above the surface of any liquids contained in said reaction vessel; an absorption trap containing an aqueous solution of hydrazine sulfate for absorption of halogens and halogen compounds connected to said gas-removal conduit whereby any gas passing through said gas-removal conduit bubbles into said aqueous solution of hydrazine sulfate; an absorption trap containing a sulfuric acid solution of potassium dichromate for absorption of sulfur compounds connected to said halogen and halogen compound absorption trap whereby any gas bubbling through said halogen and halogen compound absorption trap bubbles into said sulfuric acid solution of potassium dichromate; a drying trap containing concentrated sulfuric acid connected to said sulfur compound absorption trap whereby any gas bubbling through said sulfuric acid solution of potassium dichromate bubbles into said concentrated sulfuric acid; a residual moisture trap containing anhydrous calcium sulfate connected to said drying trap whereby any gas bubbling through said concentrated sulfuric acid passes into said residual moisture trap; a residual halogen compound and sulfur compound trap containing manganese dioxide connected to said residual moisture trap whereby any gas passing through said anhydrous calcium sulfate passes into said manganese dioxide; a combustion tube equipped with heating means and containing copper oxide connected to said residual halogen compound and sulfur compound trap whereby any gas passing through said manganese dioxide passes into said combustion tube; a barium carbonate former containing an aqueous solution of barium hydroxide connected to said combustion tube whereby any carbon dioxide discharged from said combustion tube passes into and reacts with said aqueous solution of barium hydroxide to form barium carbonate in the aqueous solution; and a conductometric means for measuring the extent of change of ion concentration in said solution due to formation of barium carbonate.

References Cited in the file of this patent
UNITED STATES PATENTS

| | | |
|---|---|---|
| 773,529 | Sewerd | Oct. 25, 1904 |
| 1,560,660 | Cain | Nov. 10, 1925 |
| 2,731,330 | Codell | Jan. 17, 1956 |

OTHER REFERENCES

Codell: Analytical Chem., vol. 30, April 1958, p. 524 to 526.

Codell: Analytical Chim. Acta, 1956, vol. 15, p. 218 to 222.

Still: Analyst, 1954, vol. 79, p. 4–17.